United States Patent
Chen et al.

(10) Patent No.: US 7,949,756 B2
(45) Date of Patent: May 24, 2011

(54) METHOD AND APPARATUS FOR MONITORING WEB SERVICES RESOURCE UTILIZATION

(75) Inventors: Ying Chen, Beijing (CN); Ying Li, Beijing (CN); Jie Qiu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 12/067,454

(22) PCT Filed: Sep. 12, 2006

(86) PCT No.: PCT/EP2006/066298
§ 371 (c)(1),
(2), (4) Date: Oct. 13, 2008

(87) PCT Pub. No.: WO2007/033922
PCT Pub. Date: Mar. 29, 2007

(65) Prior Publication Data
US 2009/0100172 A1    Apr. 16, 2009

(30) Foreign Application Priority Data

Sep. 19, 2005   (CN) .......................... 2005 1 0104803

(51) Int. Cl.
*G06F 13/00* (2006.01)

(52) U.S. Cl. .................. 709/226; 709/224; 718/104
(58) Field of Classification Search .................. 709/223, 709/224, 225, 226; 718/104, 105
See application file for complete search history.

(56) References Cited

U.S. PATENT DOCUMENTS

| 5,805,599 | A  | * | 9/1998 | Mishra et al. ................. 370/468 |
| 6,282,570 | B1 | * | 8/2001 | Leung et al. .................... 709/224 |
| 7,519,173 | B2 | * | 4/2009 | Flores et al. .............. 379/265.01 |
| 7,650,344 | B2 | * | 1/2010 | Snyder et al. ......................... 1/1 |
| 7,664,833 | B2 | * | 2/2010 | Shoolman et al. ............ 709/219 |
| 2005/0066026 | A1 | * | 3/2005 | Chen et al. .................... 709/224 |
| 2007/0061464 | A1 | * | 3/2007 | Feng et al. ..................... 709/226 |
| 2007/0162584 | A1 | * | 7/2007 | Kokusho et al. .............. 709/223 |

* cited by examiner

*Primary Examiner* — Viet Vu
(74) *Attorney, Agent, or Firm* — Ido Tuchman; William J. Stock

(57) ABSTRACT

A method for dynamically adjusting resources among a plurality of co-existing applications comprises the steps of: building a relation model between a request number and resource consumption of said plurality of applications; obtaining at multiple sampling moments a request number and resource consumption of each of said plurality of applications; calculating resource consumption ratio of each of said plurality of applications; and analyzing resource consumption of a plurality of currently co-existing applications.

12 Claims, 5 Drawing Sheets

METHOD AND APPARATUS FOR MONITORING WEB SERVICES RESOURCE UTILIZATION

This application claims priority under 35 U.S.C. §365 to International Patent Application PCT/EP2006/066298 filed Sep. 12, 2006 titled "METHOD AND DEVICE FOR DYNAMICALLY ADJUSTING RESOURCES", which claims priority to Chinese Patent Application No. 200510104803.2 filed Sep. 19, 2005, the entire text of which is specifically incorporated by reference herein.

FIELD OF THE INVENTION

The present invention relates to the dynamic adjustment of resources among multiple co-existing applications.

BACKGROUND OF THE INVENTION

With the development of computer and network technology, it is a common sight nowadays that multiple applications co-exist on the same electronic equipment. For example, multiple applications co-exist on the same computer or multiple Web services are simultaneously provided on one Web server.

Every application needs to occupy resources in an electronic equipment, such as central processing unit (CPU) resources, memory resources and the like. However, the amount of resources needed by every application varies due to specific properties of every application, e.g. time complexity, space complexity and the like. Thus, an electronic equipment wherein a plurality of applications co-exist is often faced with a difficult problem of how to rationally adjust resources among all applications.

To guarantee normal running of every application even under extreme conditions, a usual practice is to provide a maximum of resources for every application. Obviously, such a practice will cause part of resources to leave idle during normal running, thereby a waste phenomenon.

Web service is a brand-new distributed computing environment, the basic idea of which is to utilize open standard technology to realize distributed software development, software engineering and software use on the Internet. Here, "service" refers to various software distributed on the Internet. Any user, whether he is an entity user or an individual user, can use Web service technology to schedule existing service software on the Internet and construct his own application software on the basis of service demands. Scheduling can be performed among application software of different entities and among application software of customers and entities via the Web service technology, so as to support e-business, customer relation model and other applications. Although the meaning of the Web service technology is completely different from that of common Web which is only capable of providing data service, the adopted protocols and interfaces belong to the Web technology which has already in common use. The basic technology of Web service is XML, which is defined by W3C. XML is an extensible markup language for the use of data description. Different from hypertext markup language (HTML), XML describes only data contents per se but does not touch upon data display, so it can be used to describe any generalized contents. In Web services, it is XML that is used to describe remote scheduling operation and its enforcement results. This description is loaded in the simple object access protocol (SOAP), and a SOAP message is usually transmitted in the most common HTTP. Since XML text description is irrelevant to enforcement, interactions can be conducted via Web services among platforms employing different operating systems and different programming languages. The release and description of Web services per se is also implemented using XML.

Service level agreements (SLA) are commonly used by Web service providers to define their contractual service obligations to their customers. These contractual service obligations usually include response time commitments. If the service obligations are not met, the customer might be entitled to be reduction in the fees owned to the Web service provider. Web service providers are therefore highly motivated to meet the commitments in their SLAs.

To meet the SLAs, the Web service providers often provide excess capacity when statically provisioning resources for their customers because it is hard to accurately predict demands, especially for the scenarios that some customers may occasionally experience a "web storm", i.e. a dramatic temporary surge in demand. For example, a particular web service may experience a heavy request volume caused by an emergent event. The statically provisioned resources according to the average requirements can not deal with such a situation, which will cause the SLA violations. If excess capacity is provided in order to meet the SLAs under various sudden conditions, a great cost of resources is thus paid, which is unacceptable to the Web service provider.

Therefore, there is a need to dynamically adjust resources, i.e., to dynamically adjust resources allocated to each Web service according to requirements of each Web service on resources, so as to accomplish rational adjustment of resources.

Though existing electronic equipment can provide real-time reports on resource consumption, they are merely able to provide the total amount of resources consumed by the entire progress in a unit of progress or task. It is hard to provide resources consumed by each application respectively when multiple applications co-exist in one process or task. That is to say, the prior art is just able to obtain the amount of resources jointly consumed by several applications, but can not possess the proportion of resources consumed by each application in the process or task, i.e. resource consumption ratio. Therefore, in this case, existing electronic equipment cannot dynamically adjust resources among each application in one process or task on the basis of the prediction of resource consumption amount.

Besides, Grid technology which has developed lately allows enterprises to share resources as they form "virtual organizations". That is, the enterprises, which may be geographically widespread locations and which may have heterogeneous computing platforms, share their resources and services to form virtual services. The open grid services architecture (OGSA) developed by academic and scientific communities, along with commercial entities (such as IBM) is an evolution of Grid technology. OGSA enables the grid to provide the enterprises with a set of extensible services collected by the virtual organizations.

The emerging Web service resource framework (WSRF) technology is also an evolution of Grid technology. All services on Grid will be Web services with WS-Resources if the business logics of the Web services have a certain state. Thus, in this disclosure, Grid services are called "Web services" to represent the service provisioned on Grid.

Compared to the normal computing noncommercial Grids that have sufficient resources available to satisfy all concurrent users, commercial grids profit by maintaining the smallest possible set of resources that can still meet user demand. To do so, such commercial grids must efficiently manage competing demands for the same resource set. Also, since the customers of commercial Grids pay for resources, they will not tolerate being denied service or being rescheduled to a different time slot, i.e., they will not tolerate the SLA violation. Thus, it is necessary that Web services providers dynamically provision on the nodes Web services provisioned on these grids according to the present resource consumption and demands. When the demands of one Web service increase to the peak which the present resources assigned can not meet, this Web service can be remote cloned to other available nodes in the commercial Grids to get additional resources. When the demands drop down, the Web service can be moved from the node to release the additional resource for other Web services. Thus, it is necessary to observe or monitor the resource consumption of Web services for management, especially SLA enforcement. While existing tools of Web services (for example, tools developed by AmberPoint Company) focus on the measurement of SLA/Quality of Service (QoS) such as performance and security that is not enough for the Web services dynamically provisioning based on commercial Grids. Firstly, the SLA measurement can not indicate the root cause of the SLA violation, so that correct remedial measures can not be taken. For example, Web service A is found to be with a delayed response time by the SLA measurement tool, and then it is decided to schedule more resources for Web service A; while the real reason causing the response time delay of Web service A may be that the resource required by Web service A has been consumed or exhausted by Web service B running on the same electronic equipment/server. Secondly, even the detected SLA violation can be used for dynamically provisioning of the Web service, the SLA has already been violated and the customer has experienced the degraded quality of service before supplying the gap by allocating additional resources.

Therefore, the resource consumption of Web services should be measured to support the dynamical adjusting of resources, i.e., to proactively determine when and which Web service should be dynamically provisioned (remote cloned or moved) in commercial grids.

SUMMARY OF THE INVENTION

It is an object of the present invention to provide a method and device for dynamically adjusting resources among a plurality of co-existing applications.

To this end, according to an aspect of the present invention, a method of dynamically adjusting resources among a plurality of co-existing applications is provided, the method including the steps of: building a relation model between a request number and resource consumption of said plurality of applications; obtaining at multiple sampling moments a request number and resource consumption of each of said plurality of applications; calculating resource consumption ratio of each of said plurality of applications; and analyzing resource consumption of a plurality of currently co-existing applications.

According to another aspect of the present invention, a device for dynamically adjusting resources among a plurality of applications is provided, the device comprising: model building means for building a relation model between request numbers and resource consumptions of said plurality of applications; first detecting means for obtaining at multiple sampling moments the request numbers of each of said plurality of applications; second detecting means for obtaining at said multiple sampling moments resource consumptions of said plurality of applications; model learning means for calculating resource consumption ratio of each of said plurality of applications; and analyzing means for analyzing resource consumptions of a plurality of co-existing applications.

With the method and device provided by the present invention, resource consumption ratios of a plurality of co-existing applications can be obtained, and further, resource consumption of each of currently co-existing applications can be calculated according to the obtained resource consumption ratio, so that dynamically adjusting of resources is realized.

The present application is especially suitable for management of Web services on a Web server, and is of great significance for satisfaction with service level agreement of Web services and evaluation of Web services.

Other features and advantages of the present invention will become more apparent from the following description, taken in conjunction with the accompanying drawings.

BRIEF DESCRIPTION OF THE DRAWINGS

Embodiments of the invention will now be described, by way of example only, with reference to the accompanying drawings, in which.

In the accompanying drawings, the same elements and components are represented by identical reference numerals, repeated depiction thereof being omitted.

DETAILED DESCRIPTION OF PREFERRED EMBODIMENTS

Hereinafter, the present invention will be described with reference to the accompanying drawings illustrating the preferred embodiments thereof which take n (n≧2) Web services running on a Web server for example, wherein resource consumption of said n Web services on the Web server can be measured.

Figure 1:
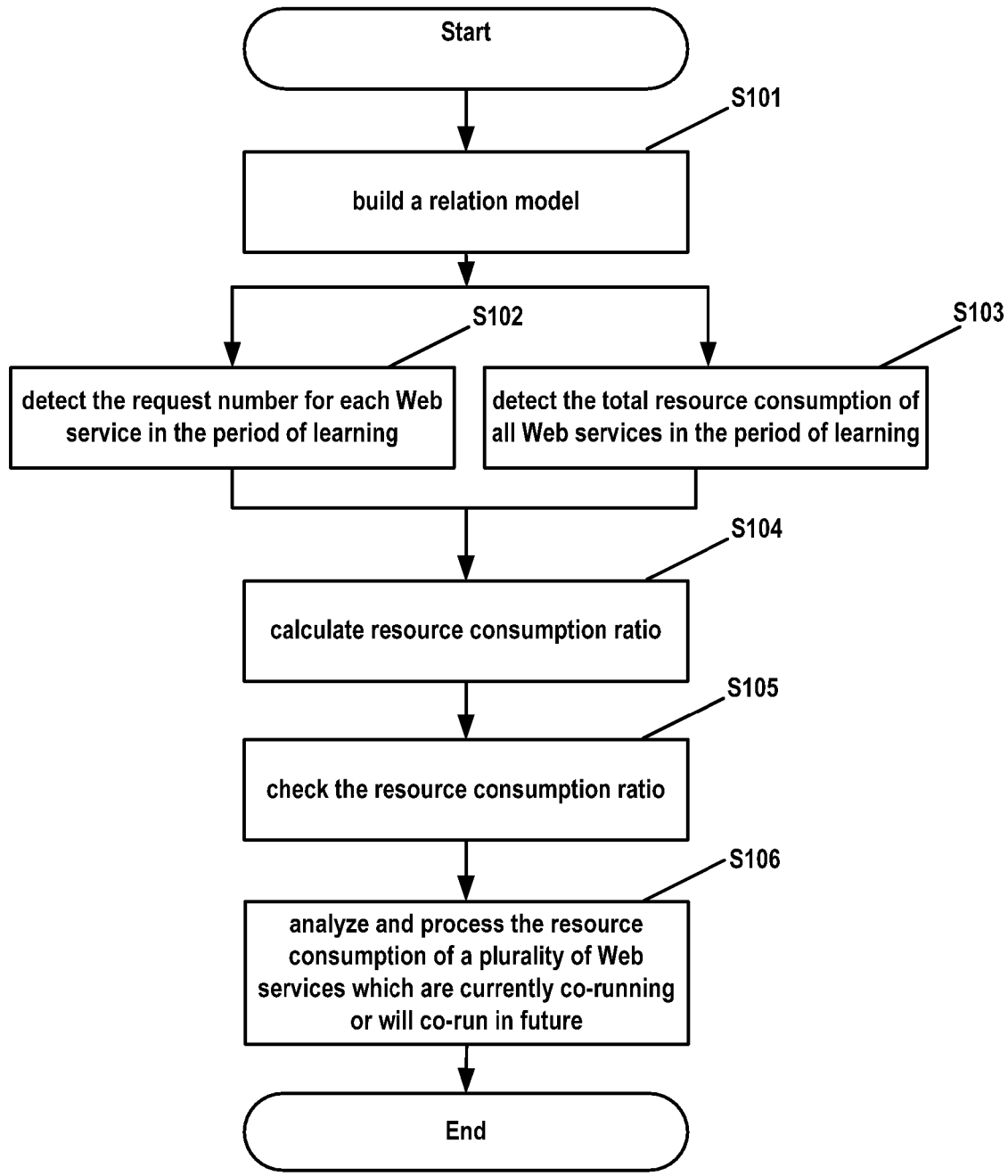
FIG. 1 is a flow chart of a method of dynamically adjusting resources according to a first embodiment of the present invention.

FIG. 1 is a flow chart of a method of dynamically adjusting resources according to a first embodiment of the present invention.

As shown in FIG. 1, in step S101, a relation model on the relationship between request numbers of n Web services and resource consumptions of these Web services running on a Web server is established. Such a relation model is called Request Number Resource Consumption (RN-RC) relation model for short.

In the present embodiment, a linear statistic model is taken for example. As illustrated by expression (1), the linear statistic model uses different resource consumption ratios to represent the resource consumption ratio of each Web service:

$$Q = As_1 * Rs_1 + As_2 * Rs_2 + \ldots + As_i * Rs_i + \ldots + As_n * Rs_n + A_0 \quad (1)$$

In expression (1), Q represents the resource consumption of n Web services on the Web server; * represents multiplying relation; $As_i$ is the resource consumption ratio of the (i)th Web service, which represents the ratio of resources on the Web server consumed by the (i)th Web service with respect to each request of the (i)th Web service, i=1, 2, . . . , n, wherein n represents the number of Web services running on the Web server; Rsi represents the request number for the (i)th Web service; and $A_0$ represents a resource consumption constant of the Web server.

After the aforesaid RN-RC relation model is determined, the flow shown in FIG. 1 goes to step S102. In step S102, the request number to each Web service at multiple moments in a determined period of time is detected. Then in step S103, the corresponding resource consumption situation for the Web server at multiple moments in the above determined period of time is detected. In the present embodiment, the above determined period of time is called period of learning, and multiple moments in the period of learning are called sampling moments. In the present embodiment, since there are n Web services running on the Web server, the request number to each Web service is respectively detected at (n+1) sampling moments, i.e. $t_1, t_2, \ldots, t_n, t_{(n+1)}$, and the total resource consumption of the n Web services is detected at each sampling moment. The detailed flow of step S102 will be depicted with reference to FIG. 2.

Those ordinary skilled in the art should understand that, the aforesaid request number to each Web service and the resource consumption of the n Web services running on the Web server can also be obtained by reading dedicated learning sequence data, for example, reading pre-stored learning data from metric data buffer.

Afterwards, the flow shown in FIG. 1 goes to step S104. In step S104, the request number to each Web service at each sampling moment detected in step S102 and the total resource consumption of the n Web services running on the Web server detected in step S103 are respectively substituted into expression (1) to obtain (n+1) equations corresponding to the (n+1) sampling moments, i.e. $t_1, t_2, \ldots, t_n, t_{(n+1)}$:

$$Qt_1 = As_1*Rs_1t_1 + As_2*Rs_2t_1 + \ldots As_i*Rs_it_1 \ldots + As_n*Rs_nt_1 + A_0$$

$$Qt_2 = As_1*RS_1t_2 + As_2*Rs_2t_2 + \ldots As_i*Rs_it_2 \ldots + As_n*Rs_nt_2 + A_0 \ldots$$

$$Qt_{(n+1)} = As_1*Rs_1t_{(n+1)} + As_2*Rs_2t_{(n+1)} + \ldots As_i*Rs_it_{(n+1)} \ldots + As_n*Rs_nt_{(n+1)} + A_0 \quad (2)$$

where, * represents multiplying relation, $Qt_1$ in the first expression represents the resource consumption of the n Web services at sampling moment $t_1$, $Qt_2$ in the second expression represents the resource consumption of the n Web services at sampling moment t2, . . . , and so on and so forth; Asi represents the resource consumption ratio of the (i)th Web service; Rsit1 represents the request number to the (i)th Web service at sampling moment t1; Rsit2 represents the request number to the (i)th Web service at sampling moment $t_2$, . . . , and so on.

Using the above expression (2), the resource consumption ratio, i.e. Asi of each Web service can be calculated, wherein i=1, 2, . . . , n, so that resources consumed by each Web service and the resource consumption of the n Web services are obtained as follows:

$$Qs_i = As_i*Rs_it$$

$$Qt = As_1*Rs_1t + As_2*Rs_2t + \ldots + As_i*Rs_it + \ldots + As_n*Rs_nt + A_0 \quad (3)$$

where, $Qs_i$ represents resources consumed by the (i)th Web service at sampling moment t; Qt represents the resource consumption of the Web server consumed by the n Web services at sampling moment t; * represents multiplying relation; $As_i$ represents the resource consumption ratio of the (i)th Web service; and $Rs_it$ represents the request number to the (i)th Web service at sampling moment t. As for the resource consumption represented by expression (3), the resource consumption ratio $As_i$ (i=1 . . . n) of each Web service is a known number obtained after calculation according to expression (2).

The calculated resource consumption ratio $As_i$ of these Web services can be checked in step S105. Since the resource consumption ratio $As_i$ represents the ratio of resources consumed by each Web service on the Web server, it should meet:

$$0 \leq As_i \leq 1 \quad (4)$$

If the resource consumption ratio $As_i$ does not meet the above-stated condition, the flow shown in FIG. 1 will return to steps S102 and S103 (not shown in FIG. 1) to re-detect the request number and resource consumption of each Web service at each sampling moment in the period of learning and to thereby re-calculate the resource consumption ratio of each Web service. The above resource consumption ratio might vary with changes of the system configuration, and then, the corresponding resource consumption ratio needs to be obtained by re-learning in the period of learning.

Of course, if consumption ratio is not required to be validated, the step S105 can be omitted. For example, the validation can be that the consumption ratio must be greater than zero or not be negative.

After the resource consumption ratio is checked to measure up, the flow shown in FIG. 1 goes to step S106. In step S106, according to the resource consumption ratio calculated in step S104 and the currently detected request number to each Web service, the resource consumption of a plurality of Web services currently co-existing on the Web server is analyzed and corresponding treatment is taken. Of course, according to the resource consumption ratio calculated in step S104 and the request number to each Web service which is about to co-exist on the Web server, the resource consumption of a plurality of Web services which are about to co-exist the Web server is analyzed and corresponding treatment is then taken.

Figure 3:
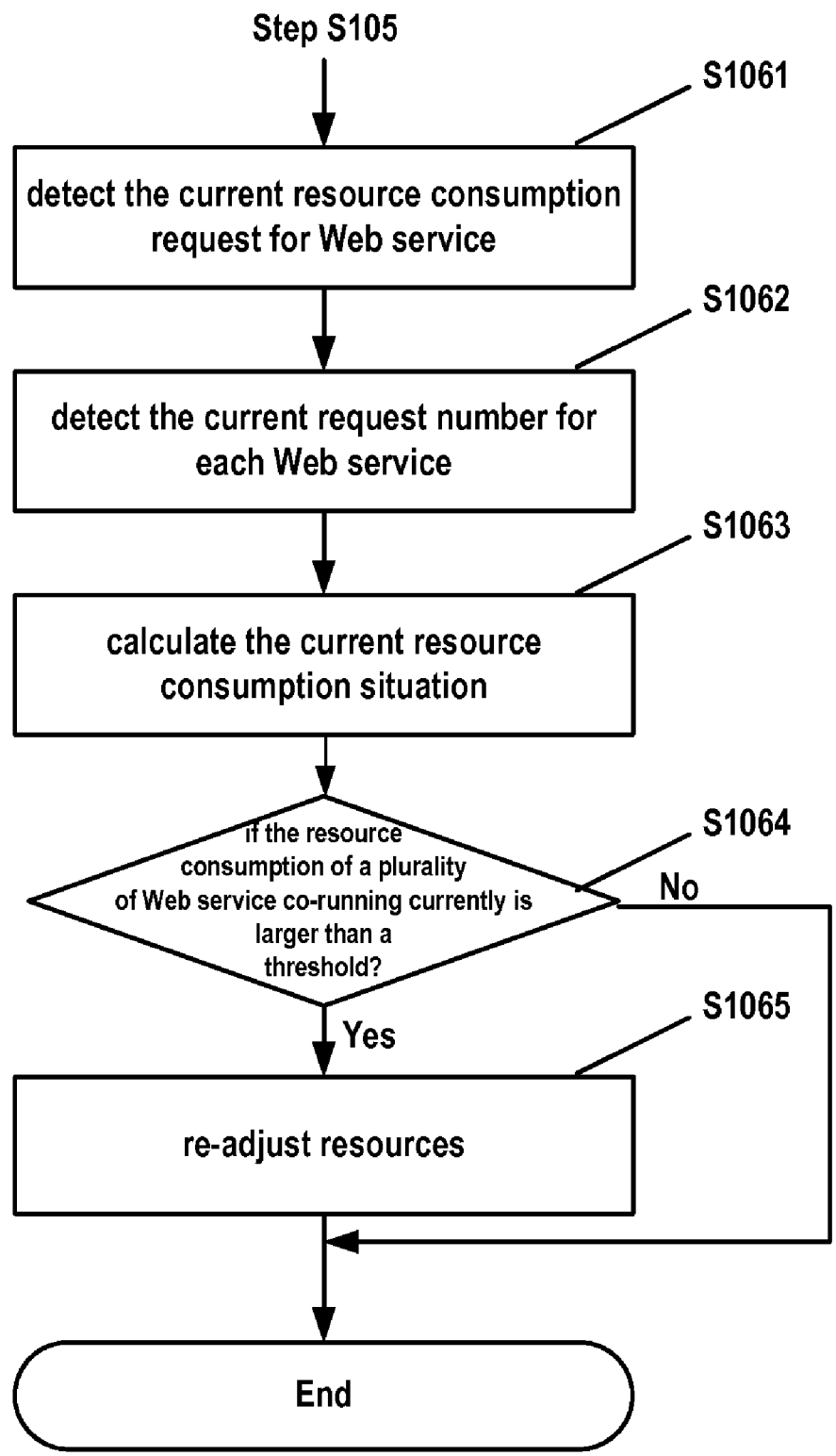
FIG. 3 is a detailed flow chart of analyzing resource consumption of a plurality of currently co-existing applications.

Referring to FIG. 3, step S106 will be depicted in detail.

Through the method as shown in FIG. 1, an electronic equipment can, according to the resource consumption ratios of a plurality of Web services obtained in the period of learning, analyze the resource consumption of the plurality of Web service co-existing on the Web server after the period of learning, perform processing based on the analysis results and then accomplish the dynamic adjusting of resources.

Figure 2:
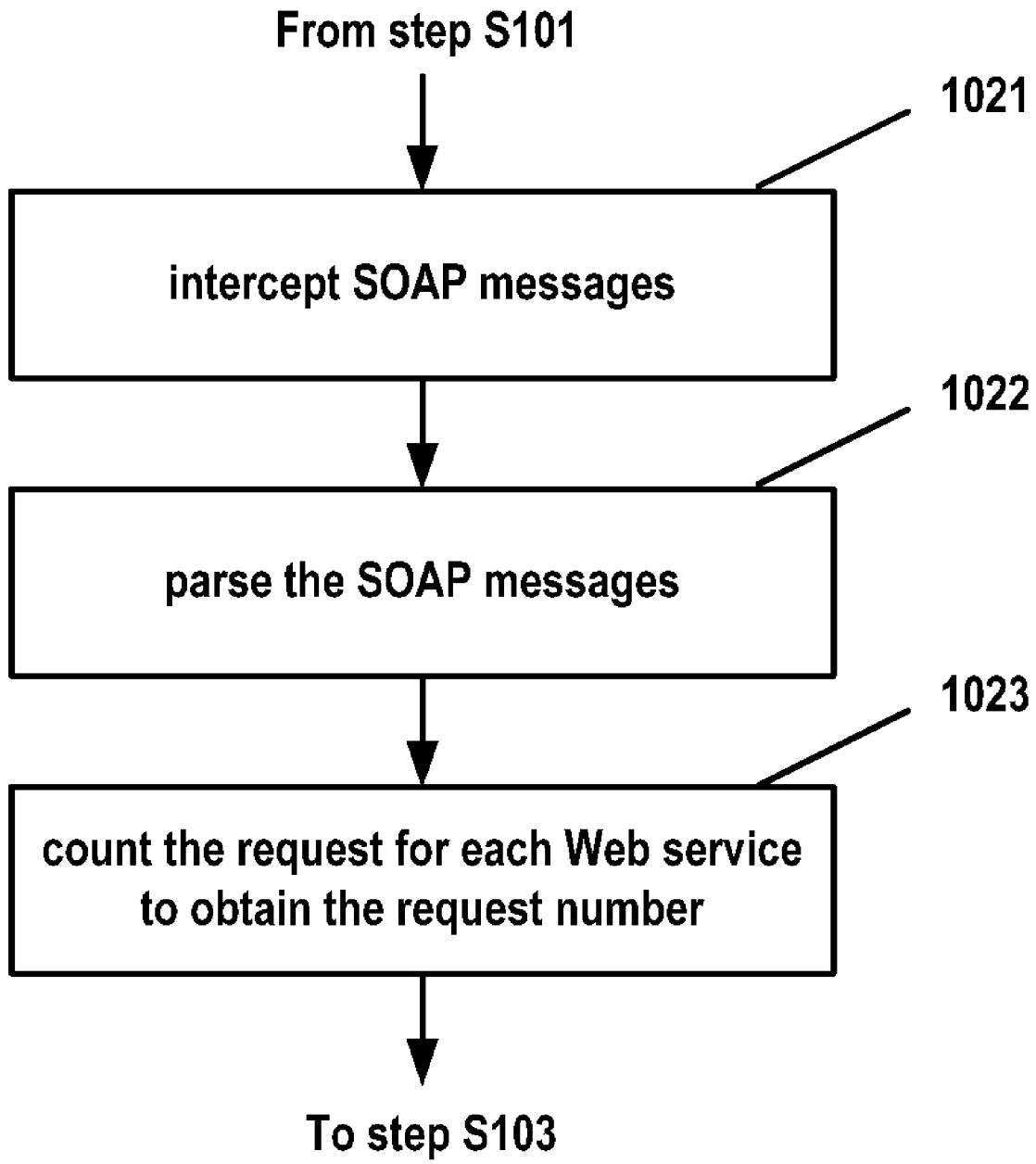
FIG. 2 is a detailed flow chart of detecting request number in the period of learning.

Hereinafter, detailed depiction will be given to step S102 shown in FIG. 1 with reference to FIG. 2.

Step S102 shown in FIG. 1 can be divided into steps S1021, S1022, and S1023. In step S1021, each simple object access protocol (SOAP) message reaching the Web server is intercepted at each sampling moment, the message serving as the request to each Web service. Specifically, a SOAP routing handler is added to the engine receiving a SOAP message. Next, an intercepted SOAP message is parsed in step S1022. In step S1022, according to the SOAP standard, the aforesaid SOAP routing handler parses part of SOAP protocol (mainly the SOAP header) to obtain the end corresponding to SOAP, which represents the name and accessed address of a concrete Web service. Then, in step S1023, the request number to each Web service is obtained by respectively counting the requests to each Web service.

The detailed flow of step S106 shown in FIG. 1 is as shown in FIG. 3. After the resource consumption ratio of each Web service, which is checked to be measure up, is obtained in step S105 shown in FIG. 1, the resource consumption requests to Web service at the current moment $t_{(n+2)}$ is detected in step S1061 shown in FIG. 3. When the above resource consumption requests are detected, the current request number to each Web service is detected in step S1062 according to these resource consumption requests. This detecting method is the same as the detecting method shown in FIG. 2, so details are omitted here. After that, the flow as shown in FIG. 3 goes to step S1063. In step S1063, the current resource consumption of Web service(s) is(are) calculated according to the current request number to each Web service and the resource consumption ratio of each Web service obtained in the preceding step. Specifically, the request number of each Web service at moment $t_{(n+2)}$ is substituted into expression (3) so that the resource consumption of each Web service and the resource consumption $Qt_{(n+2)}$ of the n Web services at moment $t_{(n+2)}$ can be calculated. Of course, if the request number of each Web service which is about to co-exist with other Web service at a certain moment is known, the resource consumption of each Web service and a plurality of Web services at this moment can also be calculated.

After finishing calculation of the resource consumption, the flow as shown in FIG. 3 goes to step S1064. In step S1064, the calculated resource consumption of a plurality of currently co-existing Web services is compared with its predetermined threshold. If the resource consumption exceeds the predetermined threshold, it means that the resource consumption of a plurality of currently co-existing Web services will go beyond a predetermined resource use range, and then the flow as shown in FIG. 3 will go to step S1065. In step S1065, resources are re-adjusted, that is, the resource consumption ratio corresponding to each Web service is re-adjusted. For example, the resource consumption ratio of the Web service with more requests may be adjusted to be smaller while the resource consumption ratio of the Web service with fewer requests may be adjusted to be larger, so that the resource consumption of these Web services will not go beyond the predetermined resource use range. If the predicted resource consumption in step S1064 does not exceed the predetermined threshold, it means that current resources can meet requirement of each Web service.

A predetermined threshold may be set for the resource consumption of n Web services, e.g. 100%; or a predetermined threshold may be set for the resource consumption of a certain Web service, e.g. 30%; or thresholds may be set for both of them at the same time. It is to be understood that selection of numeric values of the predetermined threshold does not constitute limitation to the present invention.

It should be noted that various RN-RC relation models can be built according to needs. In addition to the above-described linear statistic model, a non-linear statistic model of the neutral network, a generic algorithm model and the like can also be built. Selection of a concrete model type does not form limitation to the present invention.

The CPU resource consumption of a non-linear statistic model of the neural model can be illustrated, for example, as follows:

$$(CPUs_i)=BP(((Rs_it_j),CPUt_j,CPU_0))|BP$$

where $CPUs_i$ represents the CPU consumption of the (i)th service; $Rs_it_j$ represents the request number of the (i)th service at moment $t_j$; $CPUt_j$ represents the CPU consumption at moment $t_j$; $CPU_0$ represents a CPU consumption constant of the Web server; BP is the back propagation learning algorithm for minimizing the mean-square error $\Sigma(\Delta j^2)$, , , i=1 . . . n, j=1 . . . N; n represents the number of services running on the Web server; and N represents the number of sampling moments selected in the period of learning.

$$\Delta j=\Sigma CPUs_i-\Sigma(g_{ki}(\Sigma p_{lk}R_lt_j)))$$

where i=1 . . . n; k=1 . . . M; j=1 . . . N; l=1 . . . n; gki and plk are parameters of the neural network, which can be adjusted by the back propagation learning algorithm in the course of learning, for minimizing the mean-square error $\Sigma(\Delta j^2)$.

Those skilled in the art should understand that the steps of the method of dynamically adjusting resources according to the first embodiment of the present invention can be specifically implemented in a computer program product associated with each step running on a processing system.

To realize the method of dynamically adjusting resources as shown in FIG. 1, a device of dynamically adjusting resources is further provided, wherein illustration is made still by taking n ($n \geq 2$) Web services running on a Web server for example.

Figure 4:
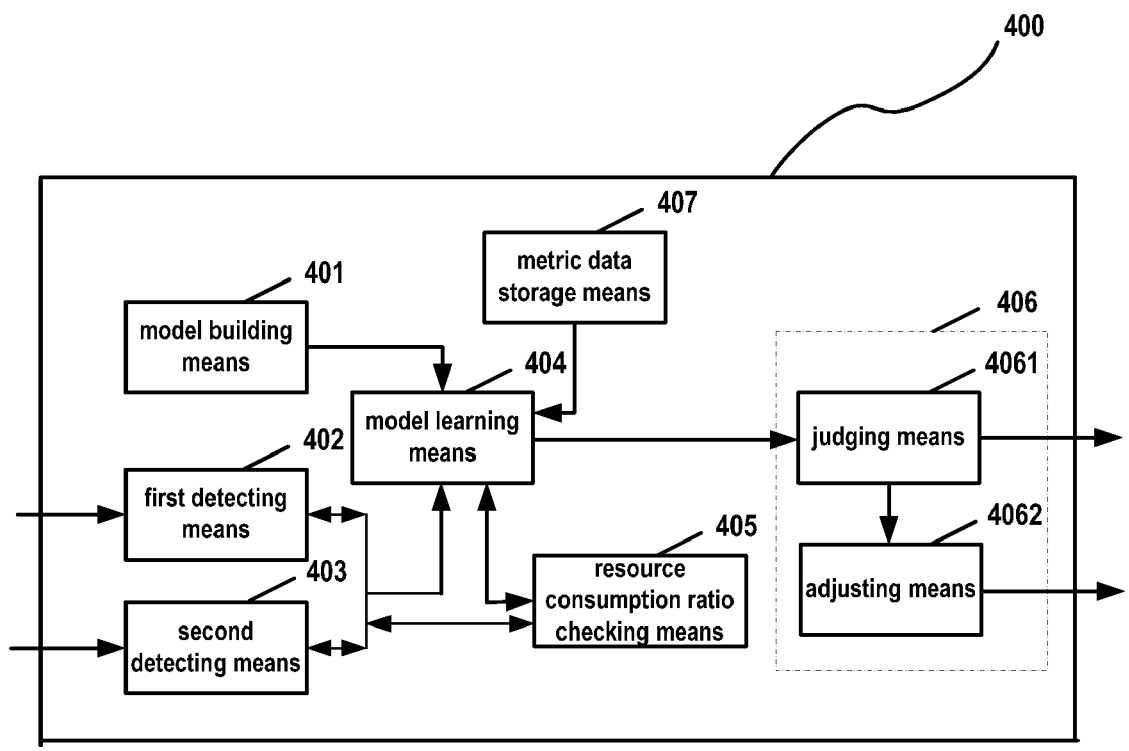
FIG. 4 is a layout view of a device of dynamically adjusting resources according to a second embodiment of the present invention.

FIG. 4 schematically shows the structure of a device of dynamically adjusting resources according to a second embodiment of the present invention. The device 400 of dynamically adjusting resources is used for dynamically adjusting resources for each Web service in the case that only the resource consumption of a plurality of Web services can be known. The device 400 of dynamically adjusting resources may be directly integrated into a Web server, or serve as an external separate device of a Web server.

The device 400 of dynamically adjusting resources as shown in FIG. 4 comprises: model building means 401, first detecting means 402, second detecting means 403, model learning means 404, resource consumption ratio checking means 405, analyzing means 406 and metric data storage means 407.

The model building means 401 is used for building a relation model on the relationship between the resource consumption of n Web services co-existing on the Web server and the request number of each Web service, i.e. an RN-RC relation model. However, it is to be understood that various RN-RC relation models can be built according to needs, such as a linear statistic model, a non-linear statistic model of the neural network and a generic algorithm model. Selection of a concrete model type does not constitute limitation to the present invention.

In a linear statistic model, different resource consumption ratios are used to represent the proportion of resources consumed by each Web service, which is as illustrated by expression (5):

$$Q=As_1*Rs_1+As_2*Rs_2+ \ldots +As_i*Rs_i+ \ldots +As_n*Rs_n+A_0 \qquad (5)$$

In expression (5), Q represents the resource consumption of n Web services on the Web server;* represents multiplying relation; $As_i$ is the resource consumption ratio of the (i)th Web service, which represents the ratio of resources on the Web server consumed by the (i)th Web service with respect to each request of the (i)th Web service, i=1, 2, . . . , n, wherein n represents the number of Web services running on the Web server; $Rs_i$ represents the request number for the (i)th Web service; and $A_0$ represents a resource consumption constant of the Web server.

The first detecting means 402 detects the request number to each Web service at multiple moments in a determined period of time. The second detecting means 403 detects the corresponding resource consumption situation for the Web server at multiple moments in the above determined period of time. Those skilled in the art can appreciate that the functions of the first detecting means 402 and the second detecting means 403 can also be performed by one means.

In the present embodiment, since there are n Web services co-existing on the Web server, the request number to each Web service is respectively detected at (n+1) sampling moments, i.e. $t_1, t_2, \ldots, t_n, t_{(n+1)}$, and the total resource consumption of the n Web services is detected at each sampling moment. The detailed structure of the first detecting means 402 will be depicted with reference to FIG. 5.

Those of ordinary skill in the art should understand that, the aforesaid request number to each Web service and the corresponding resource consumption of the Web server can also be obtained by reading dedicated learning sequence data, for example, reading pre-stored learning data from the metric data storage means 407.

According to the statistic model built by the model building means 401, the model learning means 404 substitutes the request number to each Web service at each sampling moment detected in the first detecting means 402 and the total resource consumption of the n Web services running on the Web server detected in the second detecting means 403 into expression (5) to obtain (n+1) equations corresponding to the (n+1) sampling moments, i.e. $t_1, t_2, \ldots, t_n, t_{(n+1)}$:

$$Qt_1 = As_1 * Rs_1 t_1 + As_2 * Rs_2 t_1 + \ldots As_i * Rs_i t_1 \ldots + As_n * Rs_n t_1 + A_0$$

$$Qt_2 = As_1 * Rs_1 t_2 + As_2 * Rs_2 t_2 + \ldots As_i * Rs_i t_2 \ldots + As_n * Rs_n t_2 + A_0 \ldots$$

$$Qt_{(n+1)} = As_1 * Rs_1 t_{(n+1)} + As_2 * Rs_2 t_{(n+1)} + \ldots As_i * Rs_i t_{(n+1)} \ldots + As_n * Rs_n t_{(n+1)} + A_0 \quad (6)$$

where, * represents multiplying relation; $Qt_1$ in the first expression represents the resource consumption of the n Web services at sampling moment $t_1$; $Qt_2$ in the second expression represents the resource consumption of the n Web services at sampling moment $t_2, \ldots$, and so on. $As_i$ represents the resource consumption ratio of the (i)th Web service; $Rs_i t_1$ represents the request number to the (i)th Web service at sampling moment $t_1$; $Rs_i t_2$ represents the request number to the (i)th Web service at sampling moment $t_2, \ldots$, and so on.

Using the above expression (6), the resource consumption ratio, i.e. $As_i$ of each Web service can be calculated, wherein $i=1, 2, \ldots, n$, so that resources consumed by each Web service and the resource consumption of the Web server are obtained as follows:

$$Qs_i = As_i * Rs_i t$$

$$Qt = As_1 * Rs_1 t + As_2 * Rs_2 t + \ldots + As_i * Rs_i t + \ldots + As_n * Rs_n t + A_0 \quad (7)$$

where, $Qs_i$ represents resources consumed by the (i)th Web service; Qt represents the resource consumption of the Web server consumed by the n Web services at sampling moment t; * represents multiplying relation; $As_i$ represents the resource consumption ratio of the (i)th Web service; and $Rs_i t$ represents the request number to the (i)th Web service at sampling moment t. As for the resource consumption represented by expression (7), the resource consumption ratio $As_i$ (i=1 ... n) of each Web service is a known number obtained after calculation according to expression (6). The calculated resource consumption ratio $As_i$ of these Web services can be checked in the resource consumption ratio checking means 405. Since the resource consumption ratio $As_i$ represents the ratio of resources consumed by each Web service on the Web server, it should meet:

$$0 \leq As_i \leq 1 \quad (8)$$

If the resource consumption ratio $As_i$ does not meet the above-stated condition, the resource consumption ratio checking means 405 will send a notification signal to the first detecting means 402 and the second detecting means 403 to cause the first detecting means 402 and the second detecting means 403 to re-detect the request number to each Web service and the resource consumption of the n Web services running on a Web server at each sampling moment in a period of learning, so that the resource consumption ratio of each Web service can be re-calculated.

If the resource consumption ratio $As_i$ meets the above-stated condition, the first detecting means 402 will detect the current request number to each Web service, the model learning means 404 will calculate the resource consumption of the n Web services currently co-existing on the Web server, and the analyzing means 406 will analyze whether the current resource amount of the Web server meets the requirements of all the currently co-existing Web services, and then corresponding treatment will be taken.

According to the request number to each Web service at the current moment t(n+2) detected by the first detecting means 402 and the calculated resource consumption ratio of each Web service, the model learning means 404 calculates the resource consumption of the n Web services currently co-existing on the Web server. Specifically, the request number to each Web service at moment t(n+2) is substituted into expression (7) so that the resource consumption of each Web service at moment t(n+2) and the resource consumption Qt(n+2) of the n Web services can be calculated.

The analyzing means 406 comprises a judging means 4061 and an adjusting means 4062. The judging means 4061 decides whether the current resource amount of the Web server meets the requirements of all the currently co-existing Web services according to the resource consumption of the currently co-existing n Web services calculated by the model learning means 404.

In the present embodiment, the resource consumption of the n Web services co-existing currently is compared with a predetermined threshold. If the resource consumption exceeds the predetermined threshold, it means that the resource consumption of the n Web services co-existing currently will go beyond a predetermined resource use range. Thus, the adjusting means 4062 re-adjusts resources, that is, to re-adjust the resource consumption ratio corresponding to each Web service. For example, the resource consumption ratio of the Web service with more requests may be adjusted to be smaller while the resource consumption ratio of the Web service with fewer requests is adjusted to be larger, so that the resource consumption of these Web services will not go beyond the predetermined resource use range. If the resource consumption of the n Web services co-existing currently does not exceed the predetermined threshold, it means that current allocation of resources can meet requirements of each Web service.

A predetermined threshold may be set for the resource consumption of n Web services, e.g. 100%; or a predetermined threshold may be set for the resource consumption of a certain Web service, e.g. 30%; or thresholds may be set for both of them at the same time. It is to be understood that selection of the predetermined threshold does not constitute limitation to the present invention.

Figure 5:
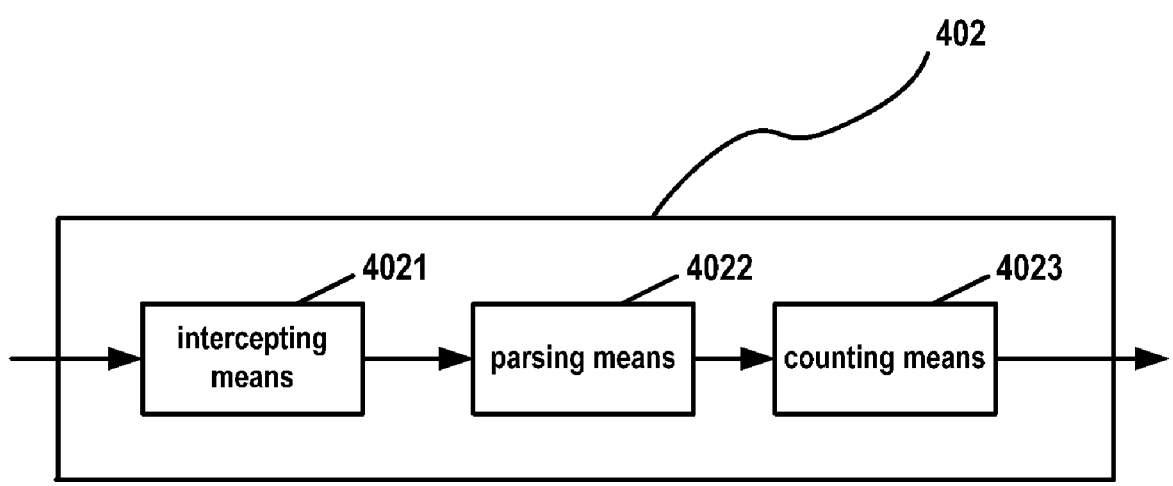
FIG. 5 is a schematic inner layout view of a first detecting means shown in FIG. 4.

FIG. 5 schematically shows the inner structure of the first detecting means in FIG. 4. The first detecting means 402 comprises intercepting means 4021, parsing means 4022 and counting means 4023.

The intercepting means 4021 intercepts at each sampling moment each SOAP message reaching the Web server. Specifically, SOAP routing handler is added to the engine receiving a SOAP message. Next, an intercepted SOAP message is parsed by the parsing means 4022. That is to say, according to the SOAP standard, the aforesaid SOAP routing handler parses part of the SOAP protocol (mainly the SOAP header) to obtain the end corresponding to SOAP, which represents the name and accessed address of a concrete Web service. Then, the counting means 4023 obtains the request number to each Web service by respectively counting the requests to each Web service.

The preferred embodiments of the present invention have been described above by taking a plurality of Web services co-existing on a Web server for example. However, the present invention is not limited to this but is also suitable for the circumstance in which a plurality of applications are co-existing on one electronic equipment. It is only an example that a plurality of applications are co-existing in a process as described above. As a matter of fact, the present invention is even suitable for the circumstance in which there is only one task running on an electronic equipment and the resource consumption of a plurality of applications running on the task is already known.

The present invention is of special practical value in a computer system which Grid technology supports. Since Grid technology allows multiple computers or servers to share their resources and services, adjusting resources for each application among different computers or servers is an extremely effective measure to improve the network performance.

The above-mentioned resources include, but are not limited to, CPU resources and memory resources.

The device of dynamically adjusting resources according to an embodiment of the present invention can be easily realized in an existing Web server without interrupting Web services. Moreover, the device of dynamically adjusting resources can provide more information for an administrator of Web services, and the method and device of dynamically adjusting resources are suitable for all kinds of Web services and platforms. The implementation of the method and device of dynamically adjusting resources of the present invention is irrelevant to the implementation of platforms, programming languages, middleware and applications.

The present invention is described specifically on the basis of the circumstances of Web server, however, the subject matter that the invention seeks to protect can be implemented in any of information technology systems. Those ordinary skilled in the field of computing may understand that there is correlation between the disclosed embodiments and the various computing circumstances as described. Further, the disclosed method can be implemented by software, hardware or the combination thereof. Thus, hardware can be implemented with dedicated logic; software, which might be stored in memory, can be performed by a proper instructions performing system, such as microprocessor, personal computer or mainframe.

As the present invention has been described with reference to the embodiments devised currently, it is to be understood that the present invention is not limited to the disclosed embodiments. Instead, the present invention is intended to cover various alterations and equivalent arrangements within the scope of the appended claims. The scope of the following claims conforms to the broadest interpretation, so as to include all such alterations, equivalent structures and functions.

The invention claimed is:

1. A method for dynamically adjusting resources among a plurality of co-existing applications, the method including the steps of:
  a) building a relation model between request numbers and resource consumptions of said plurality of applications;
  b) obtaining at multiple sampling moments the resource consumptions of said plurality of applications, and the request numbers of each of said plurality of applications;
  c) calculating, by a computer processor, a resource consumption ratio of each of said plurality of applications from the request numbers and resource consumptions obtained at said multiple sampling moments; and
  d) using the calculated resource consumption ratio of each of the plurality of applications to analyse the resource consumption of all of the plurality of co-existing applications.

2. The method as claimed in claim 1, wherein said relation model between the request numbers and the resource consumptions is a linear statistic model expressed as follows:

$$Q = As_1 * Rs_1 + As_2 * Rs_2 + \ldots + As_i * Rs_i + \ldots + As_n * Rs_n + A_o$$

where Q represents the resource consumptions of said plurality of applications; * represents multiplying relation; n represents the number of said plurality of co-existing applications; $As_i$ is the resource consumption ratio of the (i)th application, i=1, 2, ..., n; $Rs_i$ represents the request number for the (i)th application; and $A_0$ represents a resource consumption constant.

3. The method as claimed in claim 1, wherein step b) includes the steps of:
  intercepting each simple object access protocol message;
  parsing said intercepted message so as to obtain the name of an application corresponding to said intercepted message; and
  obtaining the request number for each of said applications by respectively counting said message.

4. The method as claimed in claim 1, wherein in step b), the respective request number and resource consumption of each of said plurality of applications are obtained by reading dedicated learning sequence data.

5. The method as claimed in claim 2, wherein in step c), the respective request number and resource consumption of each of said plurality of applications are respectively substituted into said linear statistic model to calculate said resource consumption ratio.

6. The method as claimed in claim 1, including the further step of: adjusting the resource consumption ratios of at least some of said plurality of applications when said resource consumption is larger than a predetermined threshold.

7. The method as claimed in claim 1, further including the step of checking whether said resource consumption ratio meets the following condition:
  $0 \leq$ resource consumption ratio $\leq 1$.

8. The method as claimed in claim 1, wherein said plurality of applications are co-existing on one electronic equipment.

9. The method as claimed in claim 1, wherein said plurality of applications are co-existing on one Web server.

10. The method as claimed in claim 9, wherein said applications are Web services.

11. A computer program product embodied in non-transitory tangible medium for dynamically adjusting resources among a plurality of co-existing applications, the computer program product comprising program code for:
  building a relation model between request numbers and resource consumptions of said plurality of applications;
  obtaining at multiple sampling moments the resource consumptions of said plurality of applications, and the request numbers of each of said plurality of applications;
  calculating a resource consumption ratio of each of said plurality of applications from the request numbers and resource consumptions obtained at said multiple sampling moments; and
  using the calculated resource consumption ratio of each of the plurality of applications to analyze the resource consumption of all of the plurality of co-existing applications.

12. A device for dynamically adjusting resources among a plurality of co-existing applications, the device comprising:
  a computer processor;
  a building module for building a relation model between request numbers and resource consumptions of said plurality of applications;
  an obtaining module for obtaining at multiple sampling moments the resource consumptions of said plurality of applications, and the request numbers of each of said plurality of applications;
  a calculating module for calculating, by the computer processor, a resource consumption ratio of each of said plurality of applications from the request numbers and resource consumptions obtained at said multiple sampling moments; and
  an analyzing module for analyzing the resource consumption of all of the plurality of co-existing applications using the calculated resource consumption ratio of each of the plurality of applications.

* * * * *